US007533354B2

(12) United States Patent
Sharp et al.

(10) Patent No.: US 7,533,354 B2
(45) Date of Patent: May 12, 2009

(54) TECHNIQUE FOR SELECTING AND PRIORITIZING CHOICES

(75) Inventors: Frederick Thomas Sharp, Menlo Park, CA (US); Chenhong Xia, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 11/213,523

(22) Filed: Aug. 25, 2005

(65) Prior Publication Data

US 2007/0050720 A1     Mar. 1, 2007

(51) Int. Cl.
G06F 3/00 (2006.01)
G06F 3/14 (2006.01)

(52) U.S. Cl. .............. 715/810; 715/765; 715/780; 715/808

(58) Field of Classification Search ............. 715/700, 715/764, 765, 780, 781, 808, 809, 810, 835
See application file for complete search history.

(56) References Cited

U.S. PATENT DOCUMENTS

| 5,774,121 | A | * | 6/1998 | Stiegler ............... 715/769 |
| 5,995,940 | A | | 11/1999 | Ramaley |
| 6,100,887 | A | | 8/2000 | Bormann et al. |
| 6,278,450 | B1 | | 8/2001 | Arcuri et al. |
| 6,341,359 | B1 | | 1/2002 | Aiken et al. |
| 6,636,990 | B1 | * | 10/2003 | Wadewitz .............. 714/48 |
| 6,685,622 | B2 | | 12/2003 | O'Connor et al. |
| 7,210,105 | B2 | * | 4/2007 | Melamed et al. ......... 715/779 |
| 7,251,782 | B1 | * | 7/2007 | Albers et al. ............ 715/711 |
| 7,343,349 | B2 | * | 3/2008 | Ranzini et al. ........... 705/64 |
| 2001/0005269 | A1 | | 6/2001 | Nozawa |
| 2001/0042060 | A1 | | 11/2001 | Rouse et al. |
| 2002/0004749 | A1 | * | 1/2002 | Froseth et al. .......... 705/16 |
| 2002/0054111 | A1 | * | 5/2002 | Knight .................. 345/764 |
| 2002/0120604 | A1 | | 8/2002 | Labarge et al. |
| 2002/0188637 | A1 | | 12/2002 | Bailey et al. |
| 2003/0071852 | A1 | * | 4/2003 | Stimac ................. 345/810 |
| 2003/0128226 | A1 | | 7/2003 | Handy Bosma et al. |
| 2004/0070627 | A1 | * | 4/2004 | Shahine et al. .......... 345/794 |
| 2004/0189708 | A1 | * | 9/2004 | Larcheveque et al. .... 345/780 |
| 2004/0210932 | A1 | * | 10/2004 | Mori et al. ............. 725/39 |
| 2004/0257337 | A1 | * | 12/2004 | Shibamiya et al. ....... 345/156 |
| 2005/0160033 | A1 | * | 7/2005 | VanKirk et al. .......... 705/38 |

(Continued)

FOREIGN PATENT DOCUMENTS

EP        1087288        3/2001

(Continued)

OTHER PUBLICATIONS

Rodriguez, P.C., W.R. Smith, D. Wood, & M.L. Wootery, "Checkbox Selection in Container Control", *IBM Technical Disclosure Bulletin*, vol. 37, No. 12, Dec. 1994, pp. 321-322.

*Primary Examiner*—X. L Bautista
(74) *Attorney, Agent, or Firm*—Janaki K. Davda; Konrad Raynes & Victor LLP

(57) ABSTRACT

Techniques are provided for prioritizing a choice. A priority box associated with a choice is provided. A priority value is received as input for the priority box, wherein the priority value both selects and ranks the associated choice. The priority value is displayed within the priority box.

27 Claims, 14 Drawing Sheets

U.S. PATENT DOCUMENTS

2005/0179947 A1* 8/2005 Kobashi et al. ............ 358/1.18
2005/0288002 A1* 12/2005 Sparks et al. ............... 455/418
2006/0029125 A1* 2/2006 Kobashi et al. ............. 375/222
2006/0059412 A1* 3/2006 Lefebvre .................... 715/500
2007/0036301 A1* 2/2007 Voticky et al. ........... 379/88.22
2007/0204308 A1* 8/2007 Nicholas et al. ............... 725/86
2007/0276675 A1* 11/2007 Gabrick et al. ................. 705/1

FOREIGN PATENT DOCUMENTS

WO            WO-0161571            8/2001

* cited by examiner

300

PriorityBox Demo

After each question, please fill in a number in the box for each choice that you select. For the first choice, put the number 1 in its box; for the second choice, put in the number 2, and so forth.

Question 1: What tools do you use frequently?

- ☐ Visual Studio NET
- ☐ WSAD
- ☐ DB2 UDB
- ☐ Oracle Enterprise Manager
- ☐ SQL Server
- ☐ Other [_____]

Question 2: What database vendors do you trust most?

- ☐ Microsoft Corp
- ☐ IBM
- ☐ Oracle
- ☐ Sybase
- ☐ Other [_____]

[Submit] [Print]

FIG. 3

PriorityBox Demo — 400

After each question, please fill in a number in the box for each choice that you select. For the first choice, put the number 1 in its box, for the second choice, put in the number 2, and so forth.

Question 1: What tools do you use frequently?

- [ ] Visual Studio.NET
- [1] WSAD — 410
- [2] DB2 UDB — 420
- [ ] Oracle Enterprise Manager
- [ ] SQL Server
- [3] Other  [text editor] — 430

Question 2: What database vendors do you trust most?

- [ ] Microsoft Corp
- [ ] IBM
- [ ] Oracle
- [ ] Sybase
- [ ] Other

[Submit]  [Print]

FIG. 4

PriorityBox Demo

After each question, please fill in a number in the box for each choice that you select. For the first choice, put the number 1 in its box; for the second choice, put in the number 2, and so forth.

Question 1: What tools do you use frequently?

- ☐ Visual Studio.NET
- [2] WSAD
- [1] DB2 UDB
- ☐ Oracle Enterprise Manager
- ☐ SQL Server
- [3] Other  | Text editor |

Question 2: What database vendors do you trust most?

- ☐ Microsoft Corp
- ☐ IBM
- ☐ Oracle
- ☐ Sybase
- ☐ Other

[Submit] [Print]

PriorityBox class
    - The GUI control, a check box that can contain a digit instead of a check.
    - Acts as a link in a doubly linked list to group PriorityBox instances.
    - Subclasses javax.swing.JCheckBox, inheriting a ButtonModel for the following states: isArmed, isSelected State
    description, text describing the choice to be prioritized
    priority, an integer
    previous, the previous PriorityBox in the group, if not first
    next, the next PriorityBox in the group, if not last
    menu, the context menu
    dragSource, the source of a drag operation
    dragTarget, the target of a drag operation Constructor, given a description
    Assign the description.
    Assign the icon to a PriorityIcon.
    Construct a context menu with the following choices:
      Select as 1
      Select
      Select All
      Unselect
      Unselect All
      Raise Priority
      Lower Priority
      Reverse Priorities
    Initialize dragSource and dragTarget objects to support drag and drop.

getPriority
    Return the priority.

setPriority, given an integer
    Assign the priority.
    Draw the icon (paintIcon) and description.

setSelected, given true or false
    Updates isSelected in the ButtonModel.
    Calls togglePriority.
    Draws the icon.

selectPriority, given an integer, p
    Selects a given priority.
    If p == 0, then unselect this PriorityBox;
    if this PriorityBox is not selected, then setSelected(true);
    if p is greater than the maximum priority
    so that our priority becomes maximum + 1;
    otherwise, if p is less than the maximum priority,
    then we are moving the priority of this PriorityBox
    and adjusting the others around it.

```
selectAll
    Select each PriorityBox in the group that is not selected
    from the first to the last.

unselectAll
    Unselect each PriorityBox in the group that is selected.

reversePriorities
    Get the maximum priority, max.
    For each PriorityBox in the group,
        Get its priority, p.
        Set its priority to the absolute value of max - p + 1.

setPrevious, given another PriorityBox
    Assign the previous PriorityBox.
    If the previous doesn't have a next, then call its setNext to this PriorityBox.

setNext, given another PriorityBox
    Assign the next PriorityBox.
    If the next doesn't have a previous, then call its setPrevious to this PriorityBox.

getPrevious
    Return the previous PriorityBox.

getNext
    Return the next PriorityBox.

togglePriority
    If the box is selected, unselect it and reduce any box in the
    group that has greater priority;
    if it is not selected, select it and assign to it the next
    priority.

increasePriority
    If selected, get the priority, p; if p > 1 then selectePriority(p - 1).
    If not selected, setSelected(true).

decreasePriority
    If selected, get the priority, p, and the maximum priority, max;
        if p < max then selectePriority(p + 1).
    If not selected, setSelected(true).
```

Respond to user inputs using the keyboard or equivalent for text input.
  If Enter, then toggleSelection.
  If Delete, Backspace, or 0, then selectPriority(0).
  If a digit, d, then selectPriority(d).
  If Up-arrow, then request focus for the previous PriorityBox.
  If Up-arrow with Alt or Ctrl, then increasePriority.
  If Down-arrow, then request focus for the next PriorityBox.
  If Down-arrow with Alt or Ctrl, then decreasePriority.    If Shift+F10, then show the context menu.
Respond to user inputs using mouse or equivalent graphical input.
  If left-button click, then toggleSelection.
  If click with Alt or Ctrl modifiers, or if double-click,
    then setSelected(true) and setPriority(1).
  If a drag gesture is recognized,
              start a drag action by remembering the source.
  If a drop occurs, identify the target;
              get the priority of the target, p;
              assign the target the priority of the source;
              assign the source the priority, p.
  If right-button click, then show the context menu.

Respond to user interactions with the context menu:
  If Select as 1, then setSelected(true) and selectPriority(1).
  If Select, then setSelected(true).
  If Select All, then selectAll.
  If Unselect, then setSelected(false).
  If Unselect All, then unselectAll.
  If Raise Priority, then increasePriority.
  If Lower Priority, then decreasePriority.
  If Reverse Priorities, then reversePriorities.

PriorityIcon class
- Paints the box and the digit for a PriorityBox.
- Subclasses javax.swing.Icon.

State
  Colors background, shadow, hilight, and darkshadow

Constructor
  Initialize the colors.

paintIcon, given a JCheckBox component, a graphics context, and x and y coordinates
  Draw the box.
  If the component is selected, draw the priority.

FIG. 11C

TECHNIQUE FOR SELECTING AND PRIORITIZING CHOICES

BACKGROUND

1. Field

Embodiments of the invention relate to a technique for selecting and prioritizing choices.

2. Description of the Related Art

Users may be asked to indicate a priority (or rank) of selected answers in a multiple choice question in either a printed version or an online version of a survey. Priorities are also referred to as rankings.

Check boxes are widely used on paper and on computer media to select answers to multiple choice questions. The user action on check boxes is a toggle action that checks or unchecks the check box. When a check box is checked, the check box may be said to be selected or on. When a check box is not checked, the check box may be said to be unselected or off. A check box is selected by adding a check in the check box and is unselected by removing the check in the check box. For the printed medium, users use a writing instrument to draw an X or other mark inside the check box. For the online medium, users click with the mouse, or type tab, arrow keys, and spacebar to check or uncheck the check box.

For the printed medium (such as a questionnaire distributed on paper) and the online medium (such as a Web survey), a group of check boxes may be used to enable a user to select one or more answers to a question. Sometimes, there may be more than one answer to a question; therefore, multiple check boxes may be selected in a group. Thus, with a group of check boxes, user may check more than one choice (i.e., more than one check box). However, in conventional systems, there are inadequate techniques provided, if any, for a user to distinguish the priority or ranking order among selected choices.

In conventional systems, the techniques provided to distinguish priority or ranking order include use of a check box and an underscored space next to the check box where a ranking is to be entered after the check box is checked or just the underscored space (without the check box) where a ranking is to be entered (i.e., where a user may print a number for printed or online media or a drop down list for online media).

The use of the underscored space may be implemented as a simple edit field that is typically used with Graphical User Interfaces (GUI) in online media. However, the edit field is not naturally constrainable to allow only correct input. For example, with online media, if a conventional edit field enables a user to enter more than one digit or any digit out of a range of digits, then the edit field is not capable of providing feedback to help the user correct an incorrect value. Also, conventional edit fields are not capable of enforcing the requirement that when a user enters only one digit, then this digit is selected when the field has focus, so that another digit may replace the digit. With conventional edit fields, each digit a user types is inserted before or after a caret (which may look like a small I-beam), but when only one digit is permitted in a field, then the caret is misleading and irrelevant because the next character typed replaces the previous character typed, rather than being inserted before or after the previous character typed.

With online media, a drop-down list may enable a user to select a priority for a choice, but drop-down lists are not available on paper. Similarly, a combo box may enable a user to type or select a priority for a choice, but the combo box does not work on paper. A combo box may be described as a drop-down list with an edit field to display a selected value. A user may either select a value from the drop down or may change or replace the selected value using the edit field.

FIG. 1 illustrates a Graphical User Interface (GUI) with a column 100 of drop-down lists to construct an order-by clause in a SQL query. With drop-down lists, only valid values are available for a single choice, but a disadvantage is that the choices may be arbitrarily restricted. For example, in FIG. 1, there are numerous columns that may be included in the select clause, but the user is given only first, second, and third sorting orders. With the illustrated drop-down lists, a digit between one and three selects Ascending, then Descending if the user repeats the same digit. Similarly, typing N selects "No Sort." However, as is illustrated in FIG. 1, inconsistent choices (e.g., skipped rankings and both Ascending and Descending order selected) may be entered and these are typically resolved by an arbitrary rule, so that the GUI doesn't show the exact order-by clause that is generated (unless a user clicks the "Generate Query" button to see the query). In the example of FIG. 1, the Descending dominates, but the relative order is preserved (e.g., baseName is used before nuPathName).

Moreover, a check box suggests that a choice must be made, which is not true of other conventional techniques, such as edit fields and drop-down lists, for specifying priorities, rankings, certainty factors, percentages, or allocations of a budget.

In print, a set of numbered scantron dots associated with each choice may be filled in with a number two pencil. This improves the ability of a computer to read a printed survey. Scantron dots are like sets of online radio buttons whose text is a number. With a set of radio buttons, only one may be selected. Sets of either scantron dots or radio buttons take more space as the number of choices increases, so the choices are typically pushed to a separate line under the description of the choice, rather than to the left or right of the description. Questions with an unequal number of choices means that alignment of the descriptions and the dots or radio buttons in columns may lead to wasted space.

A spin control accepts a limited set of numbered values that are typically selected by a user by scrolling scroll through the values with a pair of arrow buttons. A spin control may show ranking, but the spin control does not naturally indicate selection and does not work on printed media.

A list box may allow a user to make multiple, non-continuous selections and may move items in priority order, but a list does not work on printed media.

A table may have separate columns for selection and ranking. Selection may be indicated with a check box icon, and priority may be indicated by a digit and edited in an edit field. A table works on printed media, but a table is not compact and requires a great deal of user interaction because selection and ranking are in separate columns.

Thus, there is a need in the art for improved selection and prioritizing of choices.

SUMMARY

Provided are a method, article of manufacture, and system for prioritizing a choice. A priority box associated with a choice is provided. A priority value is received as input for the priority box, wherein the priority value both selects and ranks the associated choice. The priority value is displayed within the priority box.

BRIEF DESCRIPTION OF THE DRAWINGS

Referring now to the drawings in which like reference numbers represent corresponding parts throughout:

FIG. 3 illustrates a screen with priority boxes in accordance with certain embodiments.

FIG. 4 illustrates a screen that illustrates the results of a user inputting priority values in accordance with certain embodiments.

FIG. 5 illustrates a screen that illustrates the results of swapping values in priority boxes in accordance with certain embodiments.

FIGS. 11A, 11B, and 11C illustrate example pseudocode for a priority box system in accordance with certain embodiments.

DETAILED DESCRIPTION

In the following description, reference is made to the accompanying drawings which form a part hereof and which illustrate several embodiments. It is understood that other embodiments may be utilized and structural and operational changes may be made without departing from the scope of embodiments of the invention.

Embodiments provide a technique to enable a user to indicate a priority (or rank) of selected answers in a multiple choice question, where both printed and online versions of the survey are available, and where consistency between the paper and screen versions of the survey is desirable.

Figure 1:
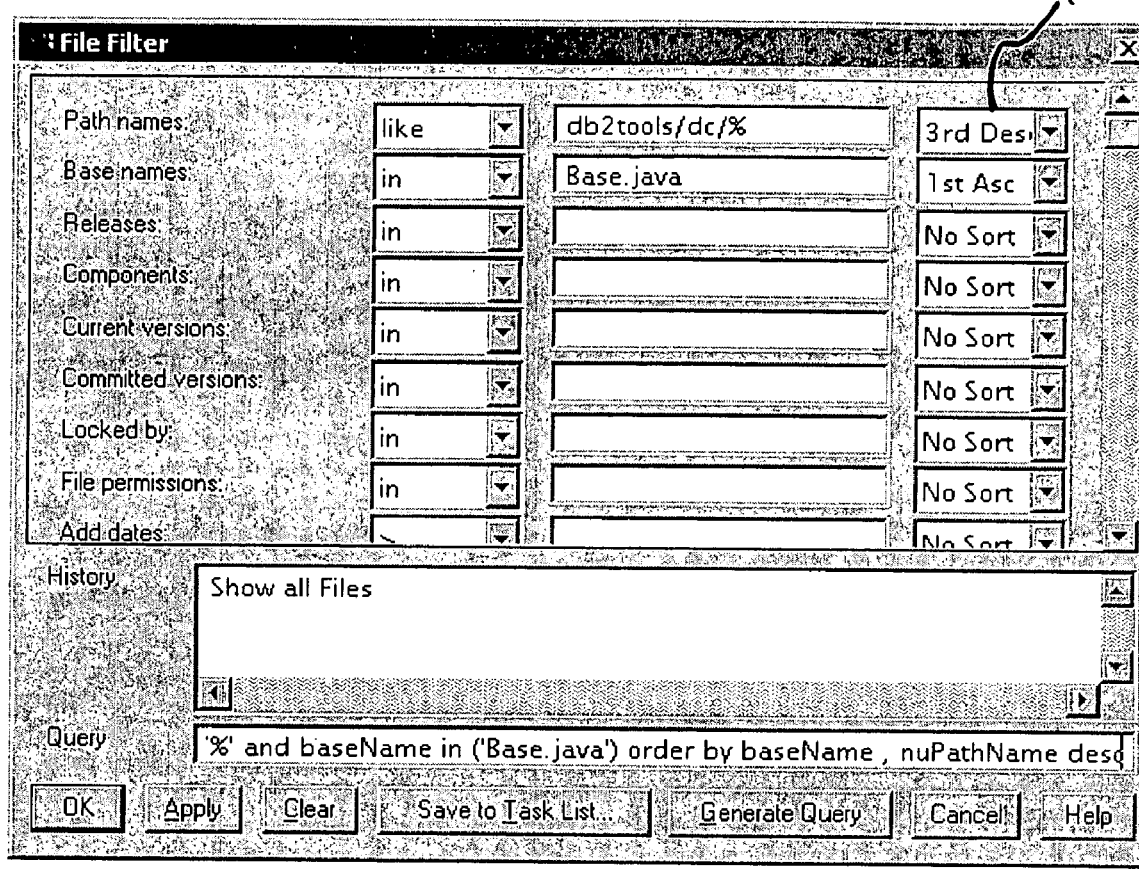
FIG. 1 illustrates a column of drop-down lists to construct an order-by clause in a SQL query.
Figure 2:
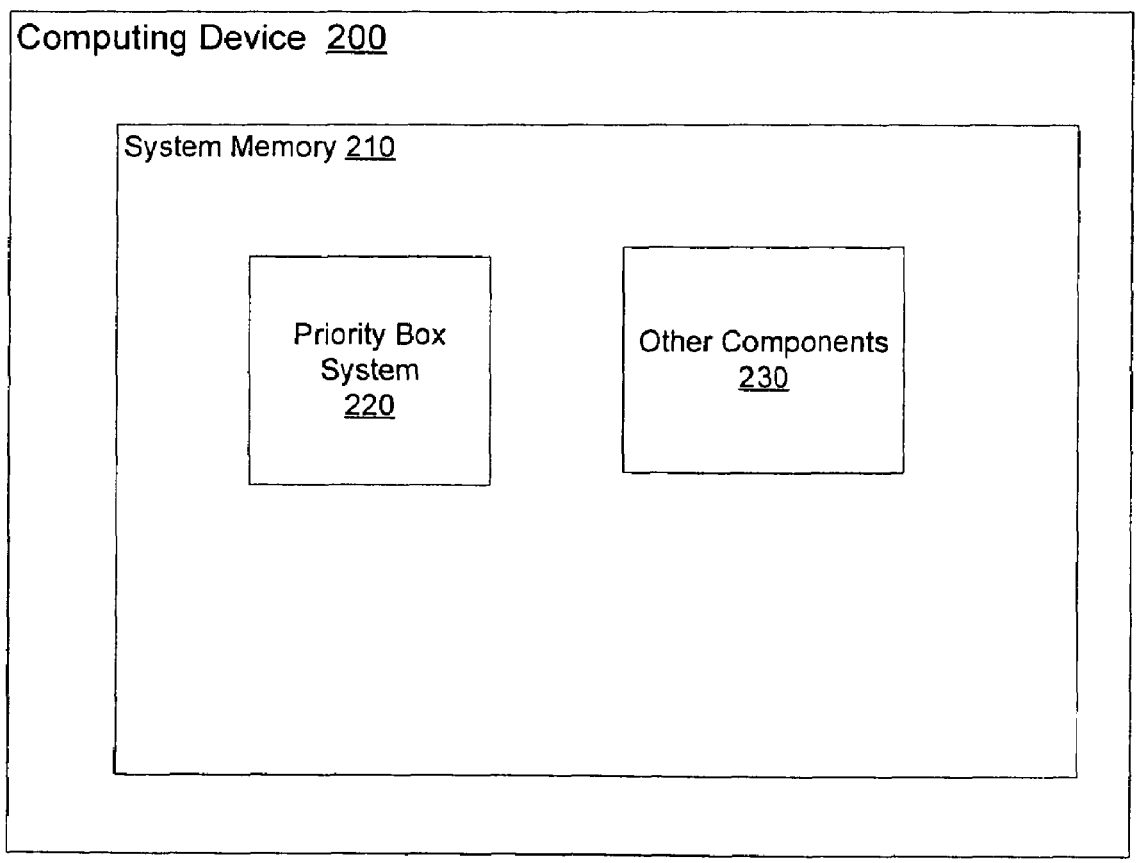
FIG. 2 illustrates details of a computer architecture in accordance with certain embodiments.

FIG. 2 illustrates details of a computer architecture in accordance with certain embodiments. A computing device 200 includes system memory 210, which may be implemented in volatile and/or non-volatile devices. A priority box system 220 is stored in the system memory 204 for execution by a processor (e.g., a Central Processing Unit (CPU)) (not shown). System memory 210 may also store other components 230.

In alternative embodiments, the priority box system 220 is a computer program that may be implemented as hardware, software, or a combination of hardware and software.

The computing device 200 may comprise any computing device known in the art, such as a server, mainframe, workstation, personal computer, hand held computer, laptop telephony device, network appliance, etc.

The priority box system 220 provides a "priority box" that enables a user to write a priority value into the priority box, which is associated with a choice. A priority box and an associated choice may be referred to as a "priority box choice." A priority box choice may be described as a description of an alternative that may be selected and prioritized. In certain embodiments, the priority box may be similar in appearance, for example, to a check box. In certain embodiments, the priority box has a distinguishable look and feel from other user interface elements (e.g., check boxes). In certain embodiments, the priority value is a digit (i.e., a number) that is used to represent the priority or ranking order of a related choice. In alternative embodiments, other ranking symbols (e.g., musical notes or the alphabet) may be used as priority values to indicate priority.

Therefore, the priority box system 220 provides both the ability to select and to prioritize a choice. The priority box may be described as a control that displays a priority value, such as a digit (instead of just a check in a box as with a check box), when the priority box is selected.

To illustrate embodiments of the invention, some examples will be provided. FIG. 3 illustrates a screen 300 with priority boxes in accordance with certain embodiments. In FIG. 3, a user reads the instruction text and tries to answer Question 1. The user has in mind the following: "WSAD" is used most frequently, then "DB2 UDB", then "Other." So, the user clicks first on "WSAD", clicks second on "DB2 UDB", clicks third on "Other", and then types in "text editor" to the text field next to "Other".

FIG. 4 illustrates a screen 400 that illustrates the results of the user's actions from FIG. 3 in accordance with certain embodiments. In FIG. 4, there is a priority value of one (1) in the priority box 410 next to "WSAD", a priority value of two (2) in the priority box 420 next to "DB2 UDB", and a priority value of three (3) in the priority box 430 next to "Other."

For this example, the user has second thoughts. The user thinks that he uses "DB2 UDB" more frequently now because his job has changed recently. The user may change the priorities with various techniques. In a first technique, the user does this by dragging the priority box 410 next to "WSAD" towards the priority box 420 next to "DB2 UDB", which results in the priority box system 220 automatically swapping the priority values. FIG. 5 illustrates a screen 500 that illustrates the results of swapping values in priority boxes in accordance with certain embodiments. In particular, there is a priority value of two (2) in the priority box 510 next to "WSAD", a priority value of one (1) in the priority box 520 next to "DB2 UDB", and a priority value of three (3) in the priority box 530 next to "Other."

Figure 6:
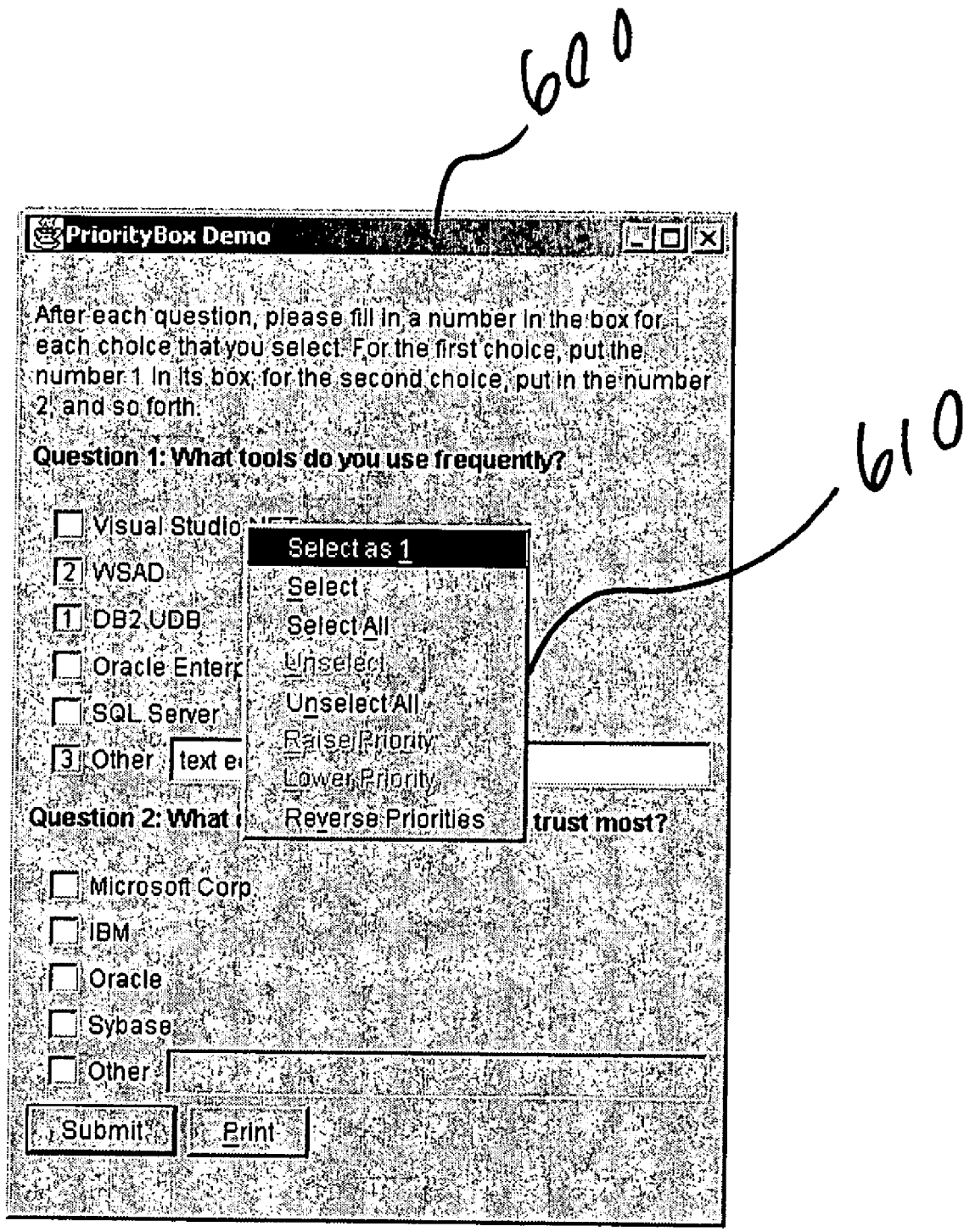
FIG. 6 illustrates a screen with a popup menu in accordance with certain embodiments.

In a second technique, the user erases the answers and starts over. The user clicks with the right mouse button anywhere on the priority box group 550 for Question 1 and selects an "Unselect All" menu. FIG. 6 illustrates a screen 600 with a popup menu 610 in accordance with certain embodiments. The available menus in the popup menu 610 for this example include "Select All", "Unselect All", and "Reverse Priorities". When the "Unselect All" menu is selected, then, the priority box system 220 resets all the priority box choices for Question 1. The user then clicks first on "DB2 UDB", clicks second on "WSAD", clicks third on "Other", and then types in "text editor" to the text field next to "Other". The results of the user's actions are those illustrated in FIG. 5. A priority box group may be described as being associated with a question and containing the choices that may be given in answer to that question. Also, the priority box group may be described as a group of priority boxes associated with a question.

In FIG. 6, when the "Select All" menu is selected, the priority box choices are prioritized top down. When the "Reverse Priorities" menu is selected, the highest priority becomes the lowest priority, and the remaining priorities are changed such that the lowest priority becomes the highest priority.

In a third technique, the user double clicks the box next to "DB2 UDB", and the priority box system 220 automatically changes the priority value of priority box 520 to one (1) and changes the priority value of priority box 510 to two (2).

A user inputs a priority value into the priority box to indicate a priority, and the priority box system 220 enforces a valid range of inputs and recognizes which value in the range of inputs indicates a higher priority than another value. For example, in certain embodiments, a user uses a number to indicate a priority in the priority box, and the valid range of inputs start with one (for the highest priority) and goes up to the number of possible answers for a priority box choice (for the lowest priority).

In certain embodiments, more than one priority box choice (i.e., multiple choices) in a priority box group may share the same value representing priority (e.g., two priority boxes could have priority one). In certain other embodiments, more than one priority box choice (i.e., multiple choices) in a priority box group may not share the same value representing priority. This may depend, for example, on the restrictions of a survey or questionnaire. For the online medium, the priority box system 220 enforces any restrictions to automatically restrict user actions. For example, if the survey restricts more than one priority box choice from sharing the same priority value, the priority box system 220 does not allow users to type the same priority value in more than one priority box choice for one question. To enforce this restriction, the priority box system 220 may, for example, display a message to the user that the priority value has already been selected (or may display some other message) or may automatically modify priority based on the value (e.g., if priority value one is given to a first priority box choice, and priority value one is also given to a second priority box choice, then the first priority box choice may be assigned the priority value of two).

A survey or interface designer may decide whether equal priorities are permitted, and how to interpret this. Assigning equal priorities refers to associating a same priority value with more than one priority box choice. If equal priorities are permitted, then typing a digit that matches the priority value of another selected priority box choice does not result in adjusting other priorities. When equal priorities are not permitted, assignment of a specified priority results in adjusting of other priorities.

In certain embodiments, a priority box has two modes of behavior: automated mode and smart mode. In certain embodiments, the developer selects the mode, while in other embodiments, the user selects the mode.

In automated mode, the priority box system 220 provides automated restrictive behavior. In automated mode, invalid inputs are ignored or automatically corrected. For example, if duplicate priorities are not allowed, then the user is not allowed to specify the same priority for two priority box choices for the same question. In certain embodiments, input of a duplicate priority results in the assignment of the next lower priority and input of an invalid value (e.g., typing an alphanumeric value when numeric values are allowed) is ignored by the priority box system 220.

Figure 7A:
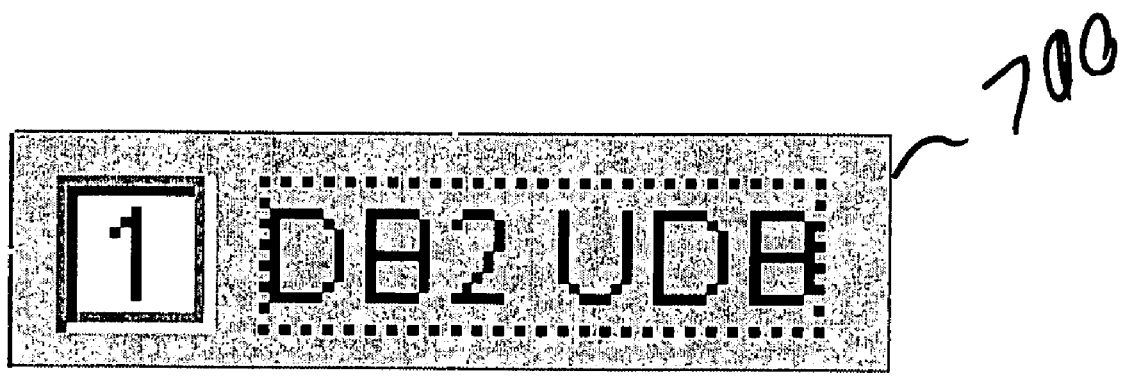
FIG. 7A illustrates a typical border for a priority box in accordance with certain embodiments.
Figure 7B:
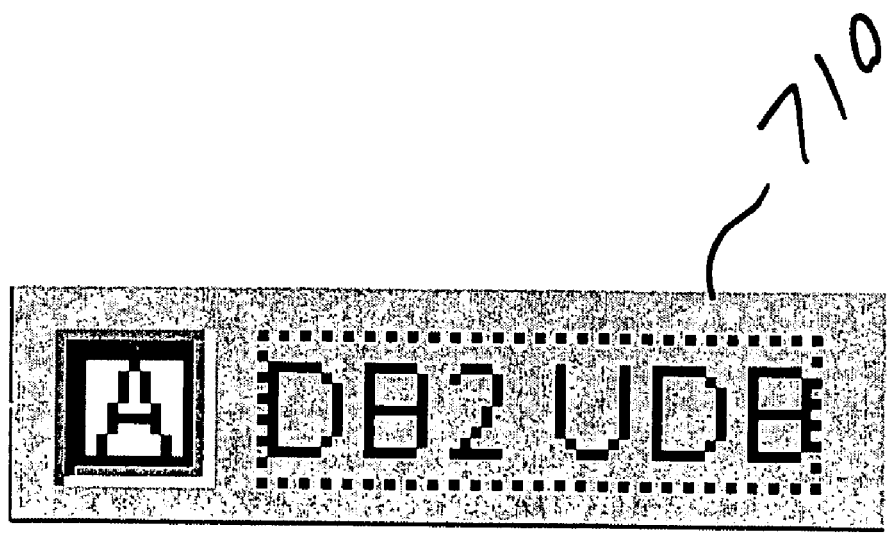
FIG. 7B illustrates an error border for a priority box in accordance with certain embodiments.

In smart mode, the priority box system 220 provides self-diagnosing and self-correcting behavior. The smart mode is described in further detail in U.S. Pat. No. 6,341,359, issued on Jan. 22, 2000, to William H. Aiken et al., and entitled "Self-Diagnosing and Self-Correcting Data Entry Components", which is incorporated by reference herein in its entirety. Smart mode may also be referred to as "smart" behavior. In smart mode, invalid inputs are diagnosed with a smart tip that appears adjacent to the priority box, and the priority box appearance is modified to indicate an error (e.g., the priority box is given a particular border that indicates an error). FIG. 7A illustrates a typical border 700 for a priority box in accordance with certain embodiments. FIG. 7B illustrates an error border 710 for a priority box in accordance with certain embodiments. In FIG. 7B, the invalid value of "A" is surrounded by a dark border (which is visible to a color blind user), and, in certain embodiments, the dark border may be in a color other than black (e.g., red).

A smart tip may be described as a box containing a diagnosis of an input error made by the user. The smart tip educates the user about the restrictions or constraints that apply to the input, and may suggest corrections, but lets the user make any desired corrections. U.S. Pat. No. 6,341,359, issued on Jan. 22, 2000, to William H. Aiken et al., and entitled "Self-Diagnosing and Self-Correcting Data Entry Components", describes a smart tip and smart component behaviors. U.S. Pat. No. 6,658,622, issued on Dec. 2, 2003, to William H. Aiken, et al., and entitled "Self-Diagnosing and Self-Correcting Data Entry Components with Dependency Behavior", describes relations between components with dependent constraints. For example, a dependent constraint may be that one priority box in a group cannot have the same priority as another priority box in the group. U.S. Pat. Nos. 6,341,359 and 6,658,622 are incorporated by reference herein in their entirety.

Figure 8:
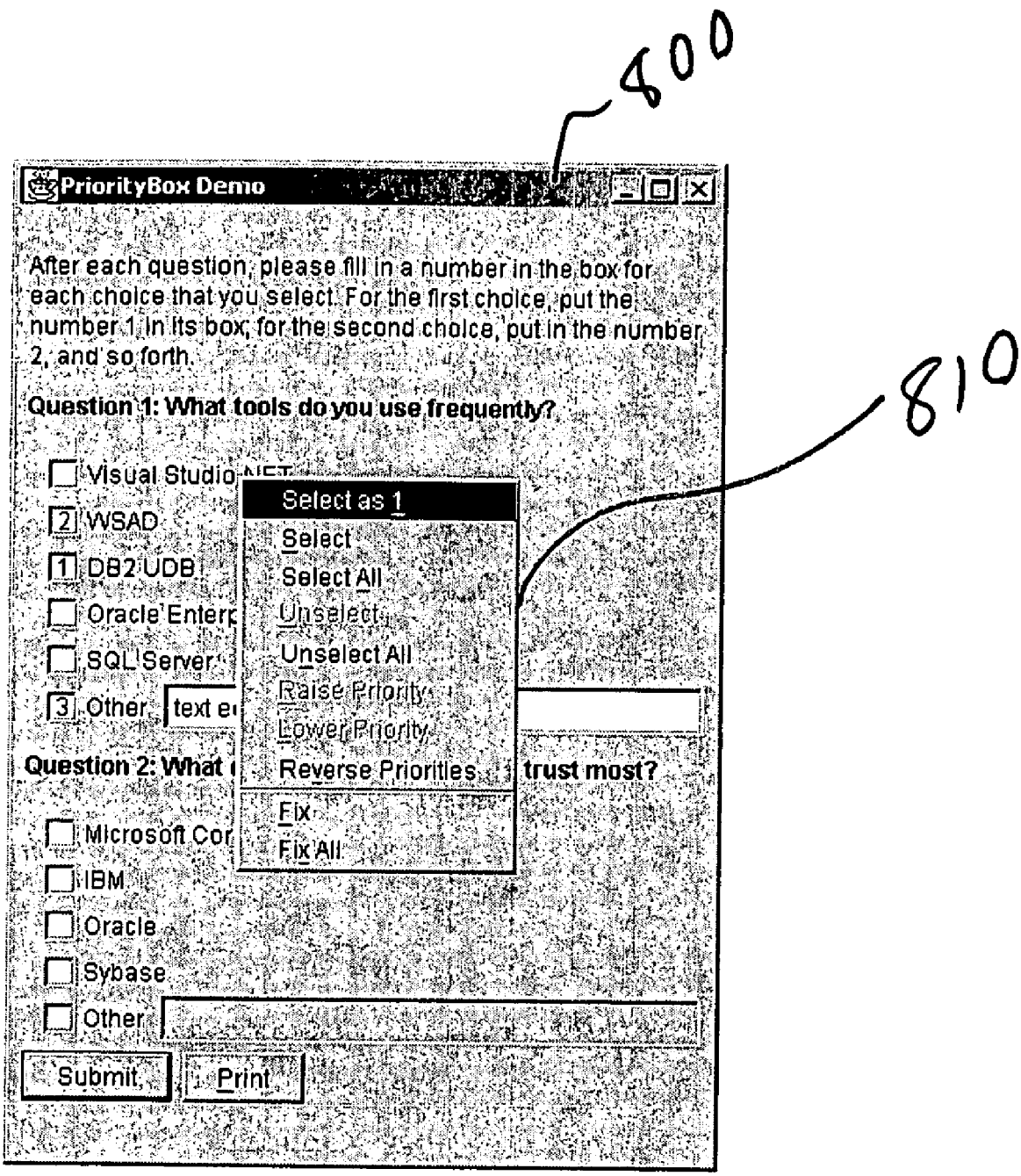
FIG. 8 illustrates a screen with a popup menu in smart mode accordance with certain embodiments.

The priority box system 220 diagnosis and display of a smart tip educates the user by providing an explanation and a suggested correction. The priority box system 220 presents and implements an ability to correct itself if the user enables smart mode. When a priority box has an invalid priority, the priority box system 220 informs the dialog box to disable a Submit button and to enable Fix and Fix All actions. FIG. 8 illustrates a screen 800 with a popup menu 810 for smart mode in accordance with certain embodiments. The popup menu includes "Fix" and "Fix All" menus. Each priority box in a group may be fixed by selecting the "Fix" menu and all priority boxes in a group may be fixed by selecting the "Fix All" menu.

Choices that customize the behavior or appearance of a priority box are called assistance policies in U.S. Pat. No. 6,341,359. An example policy is one that indicates whether duplicates are allowed. The automated or smart behavior is another such policy, and typical smart components may be associated with additional assistance policies that may control the techniques for presenting a diagnosis (e.g., timing of the smart tip containing the diagnosis and the position of the smart tip containing the diagnosis).

Assistance policies may be determined by the developer of a survey or by a user of the survey. The scope of a policy may be at a global level (i.e., applying to all priority boxes in a survey), a group level (i.e., applying to all priority box choices for a question), or a component level (i.e., applying to a single given priority box).

Figure 9:
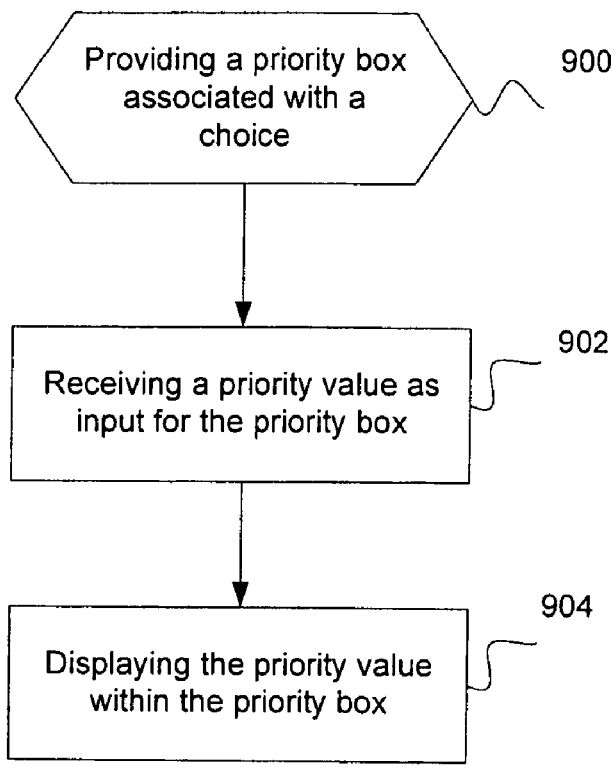
FIG. 9 illustrates logic for prioritizing a choice in accordance with certain embodiments.

FIG. 9 illustrates logic for prioritizing a choice in accordance with certain embodiments. Control begins at block 300 with the priority box system 220 providing a priority box associated with a choice. In block 302, the priority box system 220 receives a priority value as input for the priority box. In block 304, the priority box system 306 displays the priority value within the priority box.

Figure 10:
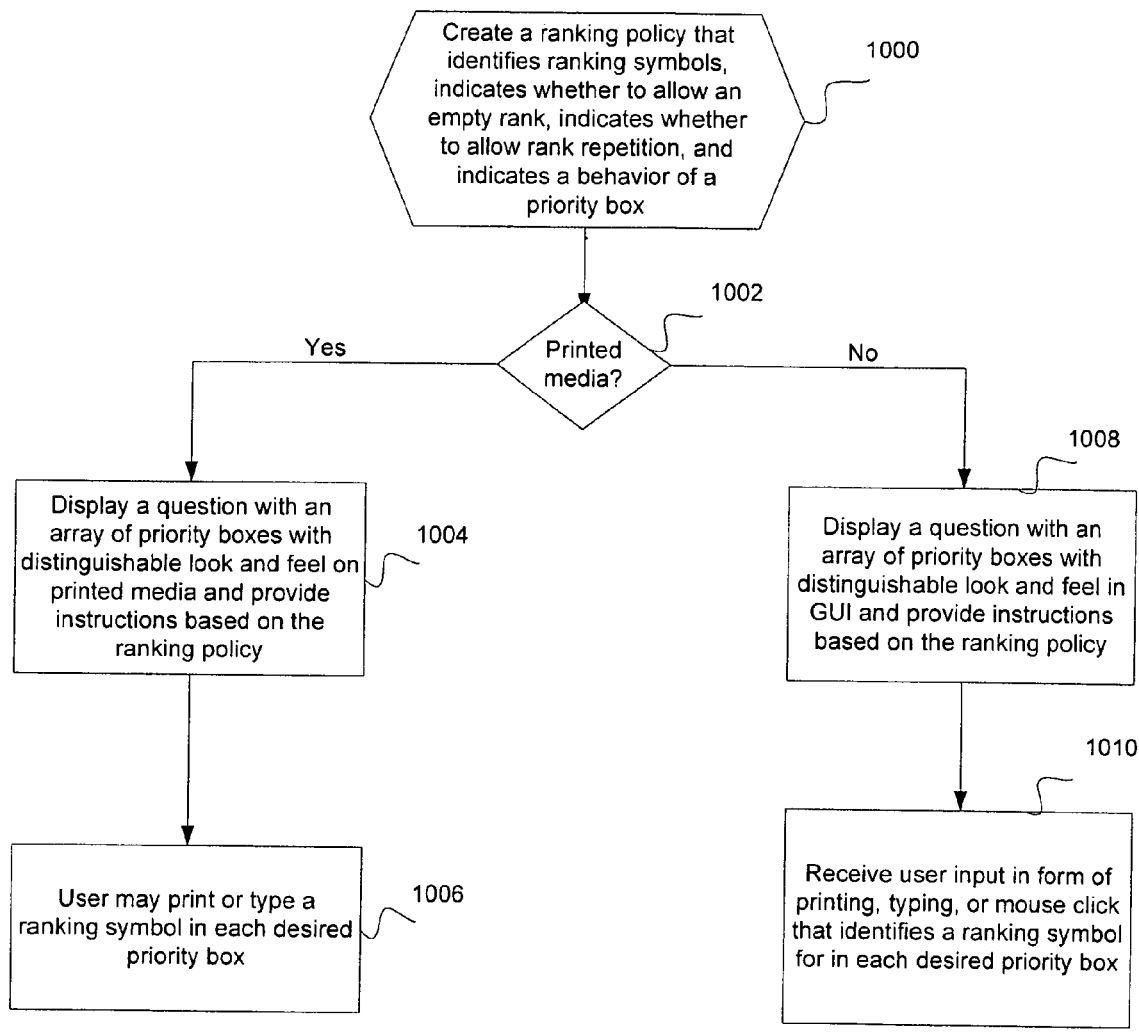
FIG. 10 illustrates logic for using a priority box in accordance with certain embodiments.

FIG. 10 illustrates logic for using a priority box in accordance with certain embodiments. Control begins at block 1000 with creation of a ranking policy that identifies ranking symbols, indicates whether to allow an empty rank, indicates whether to allow rank repetition, and indicates a behavior of a priority box. The ranking symbols act as priority values and provide a priority or rank. Also, input of a ranking symbol into a priority box indicates that a choice has been selected, while leaving a priority box empty indicates that the choice associated with the empty priority box has not been selected. The ranking symbols may be, for example, numbers (e.g., 1, 2, 3, ... ), alphabet characters (e.g., A, B, C, ... ), or percentages. If an empty rank is allowed, one or more priority boxes associated with, for example, a question may be left empty. If rank repetition is allowed, more than one priority box associated with, for example, a question may have a same value. The behavior may be automated or smart mode.

In Block 1002, it is determined whether the ranking policy is being used for a printed media or computer media. If the ranking policy is being used for printed media, processing continues to block 1004, otherwise, processing continues to block 1008.

In block 1004, a question is displayed with an array of priority boxes with distinguishable look and feel on printed media and instructions are provided on the ranking policy. In block 1006, a user may print or type a ranking symbol in each desired priority box. One or more priority boxes may be left empty based on the ranking policy.

In block 1008, the priority box system 220 displays a question with an array of priority boxes with distinguishable look and feel in a GUI and provides instructions based on the ranking policy. In block 1010, the priority box system 220 receives user input in the form of printing (e.g., using a pen device), typing (e.g., via a keyboard), or a mouse click that identifies a ranking symbol in each desired priority box. One or more priority boxes may be left empty based on the ranking policy. If automated behavior or smart mode behavior have been selected, then the user input is processed in accordance with the selected behavior.

FIGS. 11A, 11B, and 11C illustrate example pseudocode 1100, 1110, 1120 for the priority box system 220 in accordance with certain embodiments.

In accordance with certain embodiments, for the online medium, a group of priority boxes respond to inputs described herein, however, various embodiments may use different inputs instead of some or all of those described herein without departing from the scope of the invention.

Clicking a first button (e.g., a left button) of a mouse while a cursor points to a box selects or deselects the priority box choice. The selection is shown as a next available priority, starting with a first priority. For example, if the priorities are numerical values, then the first selection is assigned a priority value of one and the second selection is assigned a priority value of two.

Double-clicking with the mouse or using a single click of the mouse with a Ctrl (or Alt) key of a keyboard held down while a cursor points to a priority box selects or deselects the priority box choice, but each priority box choice is given a same priority (e.g., one) and previous priority box choices are lowered in priority.

Clicking with a second button (e.g., a right button) of the mouse while a cursor points to a priority box results in a popup menu with the following menus: "Select as 1"; "Select"; "Select All"; "Unselect"; "Unselect All"; "Raise Priority", "Lower Priority", and "Reverse Priorities". The "Select as 1" menu is a default action and is equivalent to double-clicking. Selecting the "Select" menu is equivalent to a single click with a mouse pointing to a choice that has not already been selected. When, the "Select" menu is selected, the choice that is being pointed to is added to a set of selected choices and is assigned a priority value. When "Select All" is selected, the priority box choices are prioritized top down. Selecting the "Unselect" menu is equivalent to a single click with the mouse on a choice that has already been selected. When the "Unselect" menu is selected, the choice being pointed at is removed from a set of selected choices and the priority of any choices remaining selected may be adjusted to avoid any gaps in the priority sequence (e.g., if three choices have been selected and the choice with the priority value of two is unselected, then the choice with the priority value of three is adjusted to have the priority value of two) Thus, when the "Unselect All" menu is selected, the priorities of the priority boxes in a group may be reset. When the "Raise Priority" menu is selected, the priority value of a priority box choice is exchanged with the priority value of the priority box choice having the next higher priority. When the "Lower Priority" menu is selected, the priority value of a priority box choice is exchange with the priority value of a priority box choice having the next lower priority. When the "Reverse Priorities" menu is selected, the highest priority becomes the lowest priority, and the remaining priorities are changed such that the lowest priority becomes the highest priority.

Shortcut key combinations (e.g., Ctrl+F) and post-menu key combinations (e.g., Shift+F10) may be assigned to any of the menus described herein. Merely to enhance understanding, some examples of key combinations and post-menu combinations are provided, but various embodiments may assign these and/or other combinations to the menus.

When smart behavior is enabled, the popup menu includes the "Fix" and "Fix All" menus (FIG. 8). The actions for these menus may also be invoked using Ctrl key combinations, such as Ctrl+F for Fix. The menu may be posted using Shift key combinations, such as Shift+F10.

When input is provided using a keyboard, the priority box system 220 processes the input depending on the mode. For both the automated and smart modes, if the input digit is zero, then a priority box with keyboard focus is unselected. A priority box with keyboard focus may be described as the priority box that is currently capable of receiving keyboard input.

For the automated mode, if the priority box with keyboard focus is unselected and the input digit is not 0, then the priority box choice is selected and either given the next lower priority or the typed priority. If the input digit is greater than the current lowest priority, then the priority box choice is given the next lower priority. If the input digit is less than the currently lowest priority, then the priority value of lower priority box choices are lowered by one. Giving a newly selected priority box choice, the next lower priority or the typed priority may be determined by an assistance policy.

For the smart mode, the priority box with keyboard focus is given the last character that a user types, but a violation of constraints or assistance policies is diagnosed, and, if the input is not valid, an error border appears, a smart tip appears, and the Submit and Print buttons are disabled.

Typing the Delete or Backspace key is similar to typing the input digit zero as these keys unselect a selected priority box with keyboard focus but have no effect on an unselected priority box.

Pressing the spacebar of the keyboard is similar to a mouse click (e.g., with a left button) and selects or unselects a priority box with keyboard focus.

Pressing the Up or Down arrow of the keyboard moves between priority box choices in a priority box group, wrapping from top to bottom in the list of priority box choices.

Pressing the Ctrl key with the up or down arrow key of the keyboard changes the priority up or down of a priority box choice with keyboard focus. If the priority box choice is not selected, the first Ctrl+Up or Ctrl+Down key combination selects the priority box choice and gives the priority box choice the lowest priority. Subsequent Ctrl+Up keys raise the priority value of the priority box choice (unless the priority value is already the highest priority, in which case there is no change), and subsequent Ctrl+Down keys lower the priority value of the priority box choice (unless the priority value is already the lowest priority, in which case there is no change) (is this accurate). If the Alt key is not used to show mnemonics, then the Alt+Up and Alt+Down key combinations may work in the same manner as the Ctrl+Up and Ctrl+Down key combinations. In the automated mode, the priorities of other selected priority box choices are adjusted to avoid gaps or duplicates. When the priority value is a number, the minimum range of one and maximum range of the number of selected priority box choices is observed. In the smart mode, the minimum priority is zero, the maximum priority is the number of priority box choices, and gaps and duplicates are not avoided, but they are diagnosed.

Dragging a priority from a first (or "source") priority box choice to a second (or "target") priority box choice moves the priority value of the first priority box choice to the second priority box choice. If the second priority box choice has its own priority, then the priorities of the two priority box choices exchange positions. If the Ctrl or Alt key is held down, instead of exchanging priorities, intermediate priorities are raised or lowered. For example, if a priority box choice with a priority value of one (the source) is dragged to a priority box choice with a priority value of four (the target), in certain embodiments, the default behavior is to give the target a priority value of one and the source a priority value of four, and to not change the priority of the target to be two and the priority of the source to be three. However, instead of exchanging priorities, it is possible that the user intends to shift the priority value of all priority box choices, except for the target, down by one, so that the source (having had priority one) would get priority two. Therefore, in other embodiments, instead of exchanging the values of the target and source, the default may be to shift the priority values of all choices, except for the target, down by one.

Clicking the left button of the mouse with the Shift or Ctrl key held down selects multiple choices. Use of the Shift key results in all intermediate choices being selected so that the choices are contiguous. Use of the Ctrl key results in only the choices clicked on being selected as the choices do not need to be contiguous. Another gesture that enables a user to select more than one priority box is called the marquee. A marquee may be described as a moving dashed line that appears as a border which the user drags around the items being put into focus. Pressing the Shift key and dragging the marquee results in a contiguous set of choices, while pressing the Ctrl key while dragging the marquee may result in non-contiguous selections or blocks of selections. A priority box that is not contiguous with the current selection may be added to the set, or a priority box choice in the set may be removed from the set. For items in a tree, list, or table, the result of these gestures is called "multiple selection", but for a priority box the term "selection" refers to having an assigned priority. Therefore, the term "multiple focus" is used to refer to multiple items that are in focus. After multiple priority box choices are given focus, certain gestures may affect every element in the set.

In certain embodiments, some actions that are allowed to operate on a single priority box do not operate similarly on a set (e.g., typing one if duplicates are not allowed). In certain embodiments, these actions are ignored. In alternate embodiments, these actions are given an alternative interpretation (e.g., assigning the top priority box a priority value of one and priority boxes below it descending priority values. However, certain actions operate on a set without ambiguity, such Reverse Priority, Unselect, and Fix.

The priority box provided by the priority box system 220 requires the fewest user interactions to create a simple prioritization.

Priorities ("rankings"), certainty factors, percentages, and allocation of a budget are similar in concept and may be interchangeable in survey applications. Any of these, and many other kinds of priority values, may be used in place of a simple ordinal in a priority box, with appropriate differences in the format of the numeric value and the size of the box, and with some differences in user interactions to permit numeric values with multiple digits. Any priority value (graphic, numeric, or alphabetic) may be inserted into a priority box for particular applications where, in addition to showing that a priority box choice is selected, the user may benefit from additional information (i.e., a priority value) presented in the priority box.

Assuming that the maximum priority is 9, priorities may be specified with a single character. Certainty factors, percentages, and budget allocations require a minimum of two characters (e.g., 0.9, 9%, or $9), and the number of characters is variable (for example, 0.001, 33.33% and $66).

In certain embodiments, the priority box system 220 revalues priority box choices to maintain a one-based ranking with no gaps when the user unselects and adjusts the priorities. Certainty factors, percentages, and budget allocations are associated with a total (e.g., 1.0, 100%, and the total budget, such as $100). In various embodiments, when the user sets such a priority value for a selection, the priority box system 220 ensures that the values add up to the total or approximates the total.

For example, for percentages, suppose that priority box choice A is selected first, then priority box choice A has a priority value of 100%. Then, suppose that priority box choice B is selected. In certain embodiments, the priority box system 220 assumes that priority box choices A and B each get 50%, until the user specifies something different. Then, suppose priority box choice C is selected. In certain embodiments, the priority box system 220 approximates the total by assigning 33.33% to each selected priority box choice, until the user specifies something different. In certain embodiments, the priority box system prompts the user to indicate how the 100% should be allocated to the three priority box choices. If priority boxes A, B, and C have equal percentages, and priority box choice B is selected and 55% is input as a priority value, then, in certain embodiments, priority box choices A and C are each given a priority value of 22.5%. If the priority box choice of A is selected next and a priority value of 33% is input, then, in certain embodiments, the priority box system 220 remembers that the user did not assign an explicit priority value to priority box choice C and adjusts the priority value of priority box choice C to get 33% (A), 55% (B), and 12% (C) for priority box choices A, B, and C, respectively, and, in certain alternative embodiments, the priority box system 220 takes half the overrun (half of 10.5 or 5.25% because after A is given 33%, the total percentage would be 33%+55%+22.5%=110.5%) from priority box choice B and half from priority box choice C, to get 33%, 49.75%, and 17.25% for priority box choices A, B, and C, respectively. In certain embodiments, fractional percentages are not permitted, and the above example results in an allocation of 33%, 50%, and 17% for priority box choices A, B, and C, respectively.

In certain embodiments, for percentages, if a user enters a single digit, that digit is deemed to be the desired percentage. In certain embodiments, for percentages, a user is asked to enter two digits to represent a percentage other than 100%. For example, in these embodiments, 05 represents 5%.

In various embodiments, the priority box system 220 may be configured to identify which priority value (e.g., a number or musical note) is to represent the highest priority versus the lowest priority and priorities in between. Also, the priority box system 220 may be configured to indicate whether the first or the last priority box choice selected is to be assigned the highest priority. In certain embodiments, the priority box system uses little endian ranking and selection, in which case the highest priority is one and the first priority box choice selected gets the highest priority. In various embodiments, big endian ranking and selecting, a combination of little and big endian ranking and selection, or other factors may be used to determine ranking and selection. Cultural and personal preferences may be used to determine big endian ranking and selection or a combination of little and big endian ranking and selection. These priority box choices may be established by user preferences and the results may be reported with respect to common preferences.

Thus, in certain embodiments, the priority box system 220 responds to a click of a left button of a mouse by selecting the priority box choice to which a cursor points and gives that priority box choice the next lower priority or deselects the priority box choice, if the priority box choice is already selected. If the priority of the priority box choice is not the lowest, the priority values of priority box choices with lower priorities are raised.

The priority box system 220 responds to a double-click of a left button of a mouse by selecting the priority box choice and giving the priority box choice the highest priority or deselects the priority box choice if the priority box choice is already selected. If the priority value of the priority box choice is not the lowest, the priority values of priority box choices with lower priorities are raised.

The priority box system 220 responds to a typed digit by deselecting a priority box choice or assigning the priority box choice a priority according to the digit and adjusts other selected priority box choices, if needed. In certain embodiments, typing a zero deselects a priority box choice. If the priority box choice is not selected, typing any digit selects the priority box choice and assigns the priority box choice the next lower priority. If a priority box choice is already selected, typing a digit equal to the current priority value does nothing; typing a digit greater than the lowest priority assigns the priority box choice the lowest priority and raises the priorities of priority box choices with lower priorities; typing a digit greater than the current priority lowers any priorities greater than the current priority and less than or equal to the digit; and, typing a digit less than the current priority raises any priorities less than the current priority and greater than or equal to the digit.

The priority box system 220 responds to arrow keys by moving the keyboard focus up and down among the current set of priority box choices, wrapping from top to bottom, and from bottom to top.

The priority box system 220 responds to an Alt+arrow key combination by raising or lowering the current priority value of any selected priority box choice, adjusting the other priorities accordingly. If a priority box choice is not selected, either the Alt+Up or Alt+Down key combination selects the priority box choice and gives the priority box choice the lowest priority. In certain embodiments, the Ctrl+arrow key combination has the same behavior of the Alt+arrow key combination.

The priority box system 220 responds to drag and drop operations. When a target is not selected, the source priority is moved to the target priority box choice. When the target is selected, the source and target priorities are switched.

When a priority box choice other than the last one is unselected, the priority box system 220 raises the priorities that were lower than the priority value of the priority box choice that was unselected.

Thus, the priority box provided by embodiments combines selection and ranking.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The term logic may include, by way of example, software or hardware and/or combinations of software and hardware.

The logic of FIGS. 9 and 10 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 9 and 10 may be implemented in software, hardware, programmable and non-programmable gate array logic or in some combination of hardware, software, or gate array logic.

Figure 12:
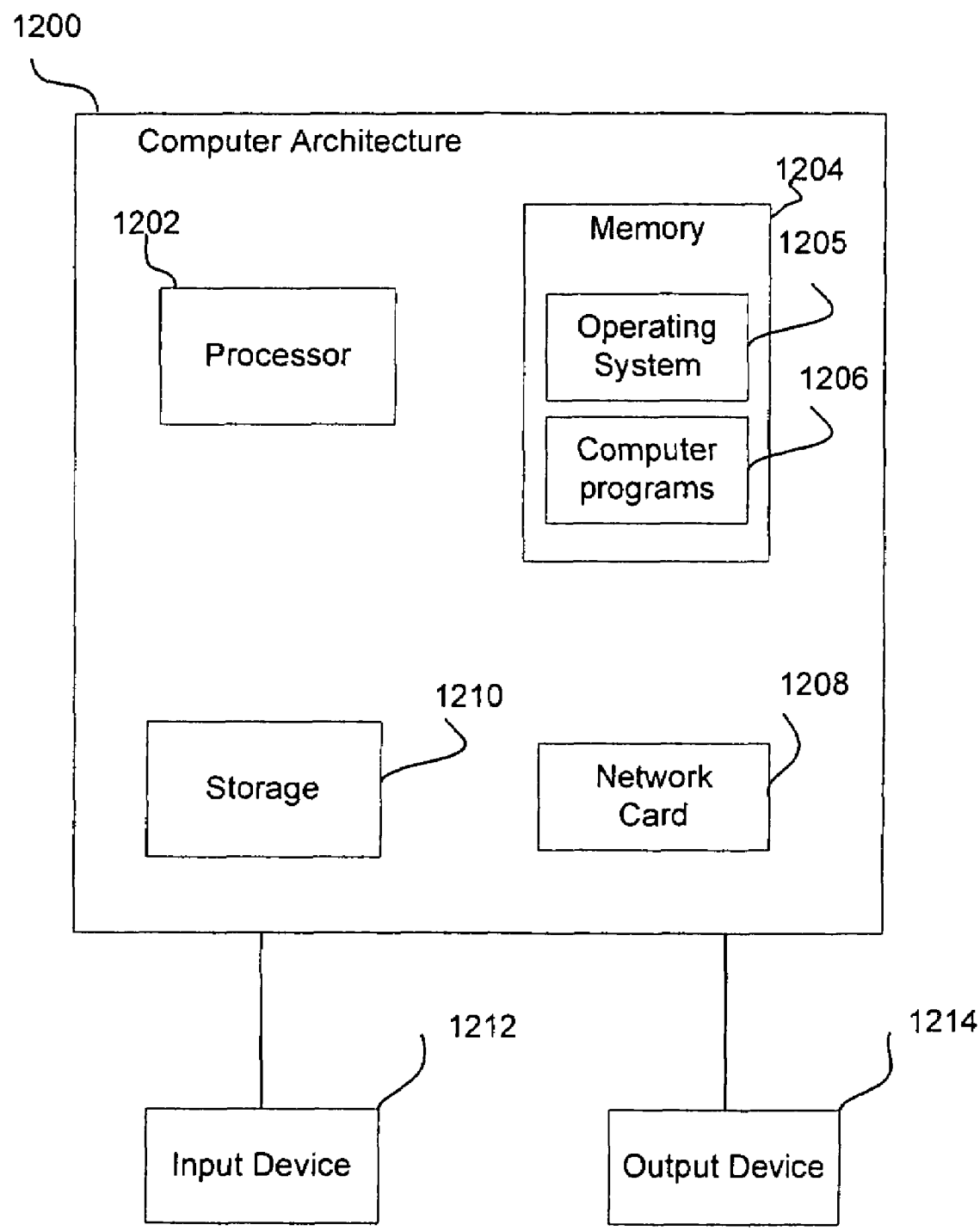
FIG. 12 illustrates an architecture of a computer system that may be used in accordance with certain embodiments.

FIG. 12 illustrates an architecture 1200 of a computer system that may be used in accordance with certain embodiments. Computing device 120 may implement architecture 1200. The computer architecture 1200 may implement a processor 1202 (e.g., a microprocessor), a memory 1204 (e.g., a volatile memory device), and storage 1210 (e.g., a non-volatile storage area, such as magnetic disk drives, optical disk drives, a tape drive, etc.). An operating system 1205 may execute in memory 1204. The storage 1210 may comprise an internal storage device or an attached or network accessible storage. Computer programs 1206 in storage 1210 may be loaded into the memory 1204 and executed by the processor 1202 in a manner known in the art. The architecture further includes a network card 1208 to enable communication with a network. An input device 1212 is used to provide user input to the processor 1202, and may include a keyboard, mouse, pen-stylus, microphone, touch sensitive display screen, or any other activation or input mechanism known in the art. An output device 1214 is capable of rendering information from the processor 1202, or other component, such as a display monitor, printer, storage, etc. The computer architecture 1200 of the computer systems may include fewer components than illustrated, additional components not illustrated herein, or some combination of the components illustrated and additional components.

The computer architecture 1200 may comprise any computing device known in the art, such as a mainframe, server, personal computer, workstation, laptop, handheld computer, telephony device, network appliance, virtualization device, storage controller, etc. Any processor 1202 and operating system 1205 known in the art may be used.

The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method for prioritizing a choice, comprising:
providing a question and a list of choices for the question;
for each of the choices:
   providing a priority box associated with the choice, wherein the priority box is a control that displays a priority value, wherein clicking a button of a mouse while a cursor points at the priority box performs one of selecting and deselecting the priority box, wherein pressing a control key with an arrow key of a keyboard changes a priority of the priority box, and wherein dragging a priority from a first priority box to a second priority box moves a priority value of the first priority box to the second priority box;
   receiving a priority value as input for the priority box, wherein the receipt of the priority value selects the choice associated with the priority box and provides a rank for the choice; and
   displaying the priority value within the priority box and the associated choice to a user;
wherein at least two of the choices for the question each have a same priority value in respective priority boxes; and
displaying a popup menu including menus for select as 1, select, select all, unselect, unselect all, raise priority, lower priority, and reverse priority, wherein, when the select menu is selected, the choice that is being pointed to is added to a set of selected choices and is assigned a priority value, wherein, when the select all menu is selected, the choices associated with the priority boxes are prioritized top down, wherein, when the unselect menu is selected, the choice being pointed at is removed from a set of selected choices and the priority of any choices remaining selected are adjusted to avoid any gaps in the priority sequence, wherein, when the unselect all menu is selected, the priorities of the priority boxes in a group are reset, wherein, when the raise priority menu is selected, the priority value of a priority box is exchanged with the priority value of a priority box having the next higher priority, wherein, when the lower priority menu is selected, the priority value of a priority box is exchange with the priority value of a priority box having the next lower priority, and wherein, when the reverse priorities menu is selected, the highest priority becomes the lowest priority, and the remaining priorities are changed such that the lowest priority becomes the highest priority.

2. The method of claim 1, wherein the priority value is a numeric value.

3. The method of claim 1, wherein more than one priority box is capable of having a same priority value for a priority box group depending on restrictions of a survey including the question.

4. The method of claim 1, wherein the priority box is provided on a printed medium.

5. The method of claim 1, wherein the priority box is provided on a graphical user interface.

6. The method of claim 1, wherein a behavior of the priority box is an automated mode behavior in which invalid inputs are one of ignored and automatically corrected.

7. The method of claim 1, wherein a behavior of the priority box is a smart mode behavior in which invalid inputs are diagnosed with a smart tip that appears adjacent to the priority box and the priority box appearance is modified to indicate an error.

8. The method of claim 7, wherein the priority box is associated with one or more assistance policies that customize the behavior or appearance of the priority box.

9. The method of claim 1, wherein the popup menu includes menus for fix and fix all.

10. An article of manufacture for prioritizing a choice, wherein the article of manufacture comprises a computer readable storage medium storing instructions, and wherein the article of manufacture is operable to:
provide a question and a list of choices for the question;
for each of the choices:
   provide a priority box associated with a choice, wherein the priority box is a control that displays a priority value, wherein clicking a button of a mouse while a cursor points at the priority box performs one of selecting and deselecting the priority box, wherein pressing a control key with an arrow key of a keyboard changes a priority of the priority box, and wherein dragging a priority from a first priority box to a second priority box moves a priority value of the first priority box to the second priority box;
   receive a priority value as input for the priority box, wherein the priority value both selects and ranks the associated choice, wherein the receipt of the priority value selects the choice associated with the priority box and provides a rank for the choice; and
   display the priority value within the priority box and the associated choice to a user;
wherein at least two of the choices for the question each have a same priority value in respective priority boxes; and
display a popup menu including menus for select as 1, select, select all, unselect, unselect all, raise priority, lower priority, and reverse priority, wherein, when the select menu is selected, the choice that is being pointed to is added to a set of selected choices and is assigned a priority value, wherein, when the select all menu is selected, the choices associated with the priority boxes are prioritized top down, wherein, when the unselect menu is selected, the choice being pointed at is removed from a set of selected choices and the priority of any choices remaining selected are adjusted to avoid any gaps in the priority sequence, wherein, when the unselect all menu is selected, the priorities of the priority boxes in a group are reset, wherein, when the raise priority menu is selected, the priority value of a priority box is exchanged with the priority value of a priority box having the next higher priority, wherein, when the lower priority menu is selected, the priority value of a priority box is exchange with the priority value of a priority box having the next lower priority, and wherein, when the reverse priorities menu is selected, the highest priority becomes the lowest priority, and the remaining priorities are changed such that the lowest priority becomes the highest priority.

11. The article of manufacture of claim 10, wherein the priority value is a numeric value.

12. The article of manufacture of claim 10, wherein more than one priority box is capable of having a same priority value for a priority box group depending on restrictions of a survey including the question.

13. The article of manufacture of claim 10, wherein the priority box is provided on a printed medium.

14. The article of manufacture of claim 10, wherein the priority box is provided on a graphical user interface.

15. The article of manufacture of claim 10, wherein a behavior of the priority box is an automated mode behavior in which invalid inputs are one of ignored and automatically corrected.

16. The article of manufacture of claim 10, wherein a behavior of the priority box is a smart mode behavior in which invalid inputs are diagnosed with a smart tip that appears adjacent to the priority box and the priority box appearance is modified to indicate an error.

17. The article of manufacture of claim 16, wherein the priority box is associated with one or more assistance policies that customize the behavior or appearance of the priority box.

18. The article of manufacture of claim 10, wherein the popup menu includes menus for fix and fix all.

19. A system for prioritizing a choice, comprising:
  logic capable of causing operations to be performed, the operations comprising:
  providing a question and a list of choices for the question;
  for each of the choices:
    providing a priority box associated with a choice, wherein the priority box is a control that displays a priority value, wherein clicking a button of a mouse while a cursor points at the priority box performs one of selecting and deselecting the priority box, wherein pressing a control key with an arrow key of a keyboard changes a priority of the priority box, and wherein dragging a priority from a first priority box to a second priority box moves a priority value of the first priority box to the second priority box;
    receiving a priority value as input for the priority box, wherein the priority value both selects and ranks the associated choice, wherein the receipt of the priority value selects the choice associated with the priority box and provides a rank for the choice; and
    displaying the priority value within the priority box and the associated choice to a user;
  wherein at least two of the choices for the question each have a same priority value in respective priority boxes; and
  displaying a popup menu including menus for select as 1, select, select all, unselect, unselect all, raise priority, lower priority, and reverse priority, wherein, when the select menu is selected, the choice that is being pointed to is added to a set of selected choices and is assigned a priority value, wherein, when the select all menu is selected, the choices associated with the priority boxes are prioritized top down, wherein, when the unselect menu is selected, the choice being pointed at is removed from a set of selected choices and the priority of any choices remaining selected are adjusted to avoid any gaps in the priority sequence, wherein, when the unselect all menu is selected, the priorities of the priority boxes in a group are reset, wherein, when the raise priority menu is selected, the priority value of a priority box is exchanged with the priority value of a priority box having the next higher priority, wherein, when the lower priority menu is selected, the priority value of a priority box is exchange with the priority value of a priority box having the next lower priority, and wherein, when the reverse priorities menu is selected, the highest priority becomes the lowest priority, and the remaining priorities are changed such that the lowest priority becomes the highest priority.

20. The system of claim 19, wherein the priority value is a numeric value.

21. The system of claim 19, wherein more than one priority box is capable of having a same priority value for a priority box group depending on restrictions of a survey including the question.

22. The system of claim 19, wherein the priority box is provided on a printed medium.

23. The system of claim 19, wherein the priority box is provided on a graphical user interface.

24. The system of claim 19, wherein a behavior of the priority box is an automated mode behavior in which invalid inputs are one of ignored and automatically corrected.

25. The system of claim 19, wherein a behavior of the priority box is a smart mode behavior in which invalid inputs are diagnosed with a smart tip that appears adjacent to the priority box and the priority box appearance is modified to indicate an error.

26. The system of claim 25, wherein the priority box is associated with one or more assistance policies that customize the behavior or appearance of the priority box.

27. The system of claim 19, wherein the popup menu includes menus for fix and fix all.

* * * * *